US012750936B2

(12) United States Patent
Veryanskiy et al.

(10) Patent No.: US 12,750,936 B2
(45) Date of Patent: Sep. 29, 2026

(54) DATACENTER NAVIGATION

(71) Applicant: Dropbox, Inc., San Francisco, CA (US)

(72) Inventors: Miron Veryanskiy, Seattle, WA (US); Eric Shobe, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 83 days.

(21) Appl. No.: 18/771,195

(22) Filed: Jul. 12, 2024

(65) Prior Publication Data

US 2026/0020126 A1 Jan. 15, 2026

(51) Int. Cl.
*H05B 47/155* (2020.01)
*G01C 21/20* (2006.01)

(52) U.S. Cl.
CPC ......... *H05B 47/155* (2020.01); *G01C 21/206* (2013.01)

(58) Field of Classification Search
None
See application file for complete search history.

(56) References Cited

U.S. PATENT DOCUMENTS 6,919,816 B2 7/2005 Dearborn et al.
9,198,264 B2 11/2015 Challapali et al.
9,713,215 B2 7/2017 Shih
10,297,097 B2 5/2019 Mottla et al.
11,062,547 B2 7/2021 Adelberg et al.
11,632,602 B2 4/2023 Cier et al.
11,954,652 B2 4/2024 Cupersmith et al.
2014/0176947 A1 6/2014 Hesketh
2016/0140868 A1* 5/2016 Lovett ................ G09B 19/0053 434/118
2024/0025336 A1 1/2024 Pendikatla et al.
2024/0140613 A1* 5/2024 Pozzi ..................... B64D 47/06
2025/0185145 A1* 6/2025 Filippov ............. G06F 21/6218

FOREIGN PATENT DOCUMENTS

EP 3185475 A1 6/2017

* cited by examiner

*Primary Examiner* — Brandon D Lee
(74) *Attorney, Agent, or Firm* — Keller Preece PLLC

(57) ABSTRACT

The present technology improves the ability of a technician to navigate within a data center by making use of lights on servers, switches, and other infrastructure devices to provide navigation queues to a technician. In particular, the present technology can instruct infrastructure devices along a path to a particular infrastructure device that a technician might need to service to operate lights, (e.g., light emitting diodes (LEDs)) in a way that signals a path to the particular infrastructure device. When a number of infrastructure devices are so instructed, an easy-to-follow and understand pattern can be created. The particular infrastructure device can be instructed to operate its lights in a way that differentiates itself from other surrounding devices that might help the technician recognize the device.

20 Claims, 5 Drawing Sheets

DATACENTER NAVIGATION

BACKGROUND

The increasing demand for cloud computing, big data analytics, and other digital services has led to a surge in the construction of large-scale data centers. These facilities are organized in a floor plan that optimizes space utilization, reduces complexity, and facilitates technician navigation.

Data centers typically include rows full of racks, and the racks hold servers for computing and storage, as well as switches and power supplies. Depending on several factors such as rack size, whether the devices are density-optimized devices, etc., a typical rack can hold 6-40 devices. A typical row can hold 10-30 racks. The number of rows in a data center can vary depending on the cooling and power distribution capabilities of a data center and, of course, the square footage of the data center, but it can be common to have 10-40 rows of racks. On the high side of this typical configuration, this can amount to 48,000 devices in a single data center. And, it should be noted some of the largest data centers can have 100,000 devices.

Data centers are typically laid out in a logical grid design that allows technicians to navigate aisles and rows of racks. Often, aisles and rows can be labeled by row numbers and column letters.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1:
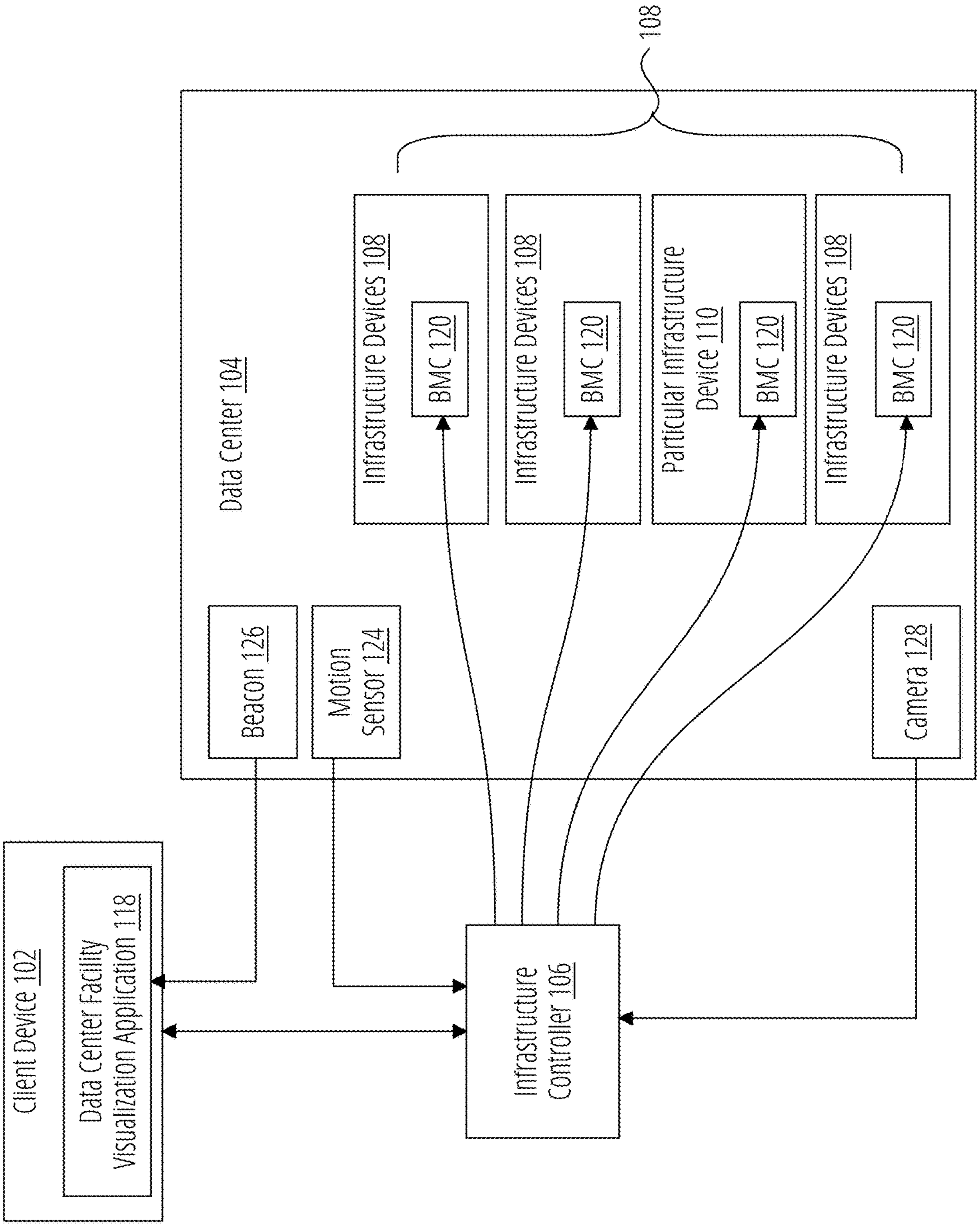
FIG. 1 illustrates a system for causing infrastructure devices of a data center to adjust the operation of lighting in accordance with some embodiments of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

A typical data center might have 10-40 rows of racks, and 48,000 devices in a single data center. While data centers are typically laid out in a logical grid design that makes it possible for a technician to navigate aisles and rows of racks, finding a specific device can still be challenging.

Sometimes, maintenance of a device in a data center can be urgent, which can increase stress on a technician, and the added stress can make the data center more difficult and overwhelming to navigate. Further, since some data centers are very large, it can be easy for a technician to forget exactly where they are in the overall floor plan of the data center. And even when the technician finds the correct isle and row in the data center, or even the correct cabinet, it can be hard to identify the correct device to work on.

The present technology addresses this problem and improves the ability of a technician to navigate within a data center by making use of lights on servers, switches, and other infrastructure devices to provide navigation queues to a technician. In particular, the present technology can instruct infrastructure devices along a path to a particular infrastructure device that a technician might need to service to operate lights, (e.g., light emitting diodes (LEDs)) in a way that signals a path to the particular infrastructure device. When a number of infrastructure devices are so instructed, an easy-to-follow and understand pattern can be created. The particular infrastructure device can be instructed to operate its lights in a way that differentiates itself from other surrounding devices that might help the technician recognize the device.

The operation of infrastructure devices to display a pattern using lighting on the infrastructure devices can also provide another benefit. The lights on some infrastructure devices are generally programmed to indicate status information. However, sometimes it is not desirable to display the status information. For example, it can sometimes occur that guests are allowed to tour a data center. In such an example, it would not be desirable to have infrastructure devices display status information, especially status information that might indicate that one or more infrastructure devices are not operating properly. In another example, devices that are doing a lot of computation might experience some dimming of their status lights. It is possible that a knowledgeable person could infer sensitive information from the dimming of the status lights.

Accordingly, the present technology can be used to operate the status lights on infrastructure devices to avoid revealing information. In some embodiments, the infrastructure devices can be controlled to display a uniform pattern. In some embodiments, the lighting on the infrastructure devices can be controlled to be off for a period.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

FIG. 1 illustrates a system for causing infrastructure devices of a data center to adjust the operation of lighting in accordance with some embodiments of the present technology. Although the example system depicts particular system components and an arrangement of such components, this depiction is to facilitate a discussion of the present technology and should not be considered limiting unless specified in the appended claims. For example, some components that are illustrated as separate can be combined with other components, some components can be divided into separate components, some components might not be present or needed, and additional components may be present.

As illustrated in FIG. 1 a client device 102 can be operated by a technician of a data center 104. The client device 102 can be used by the technician to affect changes to the operation of infrastructure devices within the data center 104 by communicating with an infrastructure controller 106 that can communicate with the infrastructure devices.

The infrastructure controller 106 can be an application running on a single server, or the infrastructure controller 106 can be a distributed application. For example, infrastructure controller 106 can be distributed across one or more infrastructure devices 108.

The client device 102 can be a mobile device, a laptop, a tablet, or any compatible computing device. The client device 102 can communicate with the infrastructure controller 106 via a Wi-Fi network/connection, a Bluetooth connection, a wired connection, or any combination thereof.

The client device 102 may run a data center facility visualization application 118, where the data center facility visualization application 118 can allow a user of the client device 102, such as a technician, to view one or more parameters associated with the data center 104. For example, the data center facility visualization application 118 can display status information relating to the functioning and processing health of individual infrastructure devices 108, or groupings of infrastructure devices such as by racks or rows of devices.

The technician can also operate the data center facility visualization application 118 to control some aspects of one or more infrastructure devices 108. For example, the technician can operate data center facility visualization application 118 to identify a particular infrastructure device 110, which is one of the infrastructure devices 108 for servicing, which can cause the infrastructure devices 108 to temporarily change the operation of the lighting of the infrastructure devices 108 to help guide the technician throughout the data center 104 toward the particular infrastructure device 110.

The technician can also operate the data center facility visualization application 118 to operating in an extended reality (XR)/augmented reality (AR) mode whereby the data center facility visualization application 118 can capture video frames including infrastructure devices in the data center. In some embodiments, the infrastructure devices can encode information in a sequence or modulation of lighting devices on their exterior housing. The data center facility visualization application 118 can capture video where the video frames capture the sequence or modulation of the lighting elements and can decode the information encoded in the sequence or modulation of the lighting elements. In some embodiments, the information that is encoded can uniquely identify the infrastructure device. In some embodiments, the information that is encoded can convey detailed status information.

Infrastructure devices can include any device within the data center. For example, an infrastructure device can include a server, switch, router, overhead lighting, cooling units, etc. Any device that is in communication, directly or indirectly, with the infrastructure controller 106 and that can receive and act on instructions to modify a lighting pattern can be one of the infrastructure devices 108. Most often this will be a switch or server because there are more of these devices in a data center than any other device. Additionally, while the present description refers specifically to controlling lighting elements, the present technology could work just as well by controlling other aspects of the infrastructure devices 108. For example, infrastructure devices 108 could have a speaker, chime, vibration mechanism, etc. that could be perceivable by a technician. The reason that the present description refers to lighting elements is that routers, switches, and servers already have a number of lighting elements in the form of LEDs on the devices. And data centers also have overhead lighting.

As illustrated in FIG. 1, the infrastructure devices 108 can include a baseboard management controller 120. The baseboard management controller 120 is a controller that controls a respective one of the infrastructure devices 108. While the term baseboard management controller 120 is most commonly associated with a controller for a switch, router, or server, in the context of the present technology, a baseboard management controller 120 can also be a controller or processor that can control other types of infrastructure devices 108.

The data center 104 can also include one or more motion sensor 124 or camera 128 that is in communication with infrastructure controller 106. The motion sensors 124 or camera 128 can detect motion within the data center. Motion sensors are generally used to trigger overhead lighting to turn on automatically or to turn off automatically or to turn on camera 128. Since a particular motion sensor 124 or camera 128 is generally located at a fixed position, when the motion sensor 124 or camera 128 is triggered, it can be inferred that the technician provided the motion that triggered the motion sensor 124, or the camera 128 can use machine vision to identify a human that is inferred to be the technician. Therefore, it can be inferred that the technician is close to the location of the particular motion sensor, and this can be used in embodiments where it is helpful to know the approximate current location of the technician in the data center.

The data center 104 can also include one or more beacons 126. Beacons 126 can be transmitters of signals that are detectable by client device 102 and interpretable by data center facility visualization application 118 to help data center facility visualization application 118 determine the location of the client device 102 on the floorplan of the data center. In some embodiments, the beacon 126 can be a Bluetooth Low Energy (BLE) device. In some embodiments, beacon 126 can be a plurality of transmitters or even Wi-Fi access points that can be used to locate a device in the data center 104 using a trilateration technique.

Figure 2:
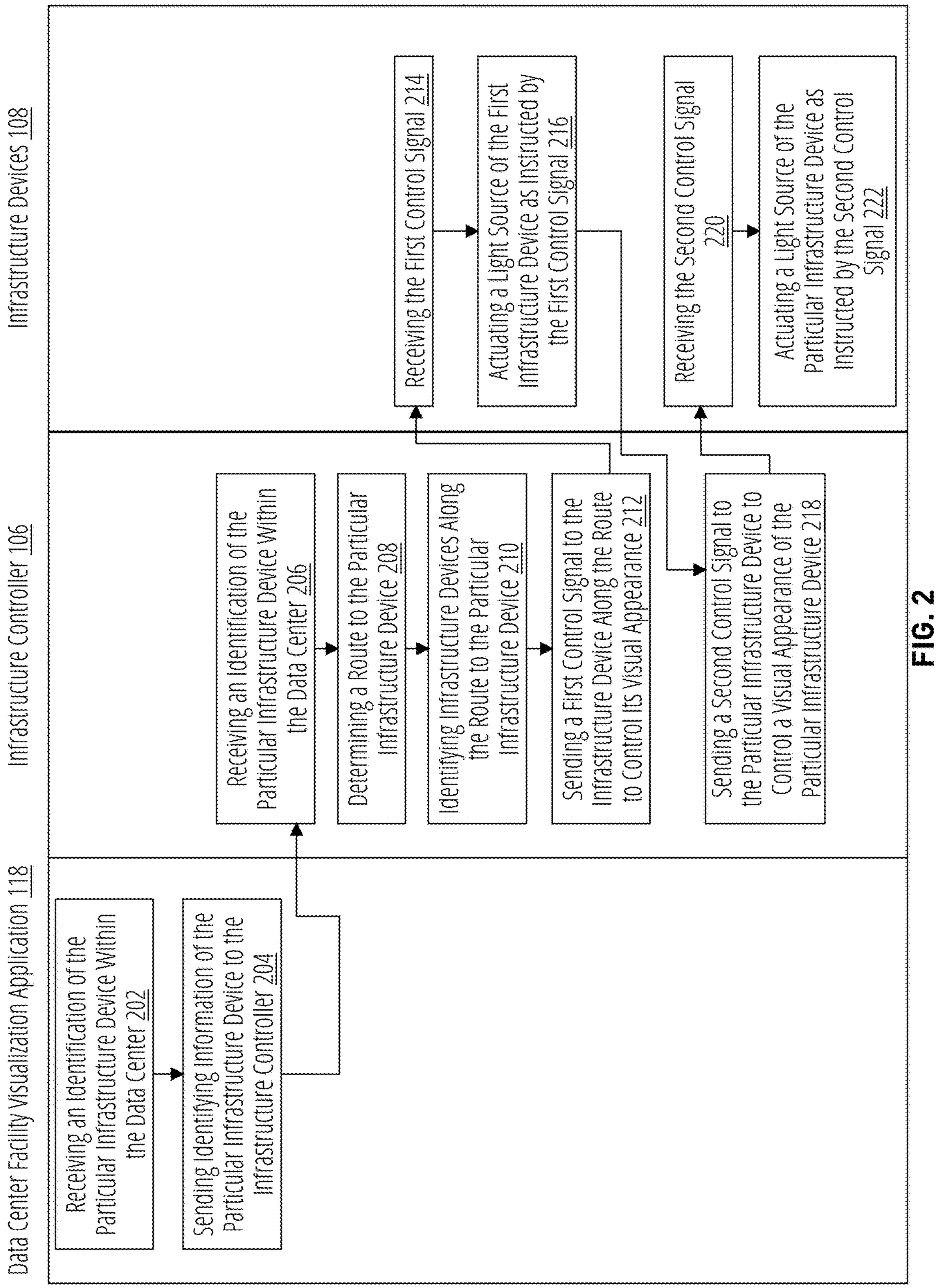
FIG. 2 illustrates an example routine for routing a technician to a particular infrastructure device within a data center by controlling other infrastructure devices to indicate a path to the particular infrastructure device, in accordance with some embodiments of the present technology.

FIG. 2 illustrates an example routine for routing a technician to a particular infrastructure device within a data center by controlling other infrastructure devices to indicate a path to the particular infrastructure device, in accordance with some embodiments of the present technology. Although the example routine depicts a particular sequence of operations, the sequence may be altered without departing from the scope of the present disclosure. For example, some of the operations depicted may be performed in parallel or in a different sequence that does not materially affect the function of the routine. While some functions are illustrated and described as being performed by a particular device, different components of the system that implements the routine may perform functions at substantially the same time or in a specific sequence. For example, some functions performed by the data center facility visualization application 118 or the infrastructure controller 106 could be interchangeable (i.e., could occur on the other device).

As introduced above, it would be helpful to provide data center technicians with visual queues that are easy to follow to help the technician find their way to a particular infrastructure device in a data center. As addressed below, the present technology addresses this problem and improves the ability of a technician to navigate within a data center by making use of lights on servers, switches, and other infrastructure devices to provide navigation queues to a technician. In particular, the present technology can instruct infrastructure devices along a path to a particular infrastructure device that a technician might need to service to operate lights, (e.g., light emitting diodes (LEDs)) in a way that signals a path to the particular infrastructure device. When a number of infrastructure devices are so instructed, an easy-to-follow and understand pattern can be created. The particular infrastructure device can be instructed to operate its lights in a way that differentiates itself from other surrounding devices that might help the technician recognize the device.

In some embodiments, the infrastructure device can be a server, router, rack, cabinet, overhead lighting device, etc., in the data center.

According to some examples, the method includes receiving an identification of the particular infrastructure device 108 within the data center 104 at block 202. For example, a technician can operate the data center facility visualization application 118 on the technician's client device 102 to identify the particular infrastructure device 110, whereby the data center facility visualization application 118 illustrated in FIG. 1 may receive the identification of the particular infrastructure device. The particular infrastructure device 108 may be selected for repairs, updating, routine maintenance, and/or any suitable actions carried out by a technician or any user of the client device 102.

According to some examples, the method includes sending identifying information for the particular infrastructure device to the infrastructure controller 106 at block 204. For example, the data center facility visualization application 118 illustrated in FIG. 1 may send the identifying information of the particular infrastructure device to the infrastructure controller 106 with a request to control the infrastructure device within the data center to display information to guide the technician to the particular infrastructure device.

According to some examples, the method includes receiving an identification of the particular infrastructure device within the data center at block 206. For example, the infrastructure controller 106 illustrated in FIG. 1 may receive an identification of the particular infrastructure device within the data center. In some embodiments, the infrastructure controller 106 may receive the identification of the particular infrastructure device automatically when a fault or error has occurred at the particular infrastructure device.

While, at block 202 and block 204, it was addressed that a technician can select the particular infrastructure device, in some embodiments, the infrastructure controller 106 could identify a particular infrastructure device, such as when the particular infrastructure device triggers an alarm indicating a malfunction with the particular infrastructure device, or such as when the particular infrastructure device reports a key performance indicator outside of a threshold. Accordingly, it is not necessary that the infrastructure controller 106 identify the particular infrastructure device by receiving a communication initiated by a technician.

According to some examples, the method includes determining a route to the particular infrastructure device at block 208. For example, the infrastructure controller 106 illustrated in FIG. 1 may determine a route to the particular infrastructure device.

In some embodiments, the infrastructure controller 106 can store a map of the data center and the locations of infrastructure devices within the data center. The layout of a particular data center 104 may vary based on the configuration of the data center 104. As such, the infrastructure controller 106 may refer to a pre-determined three-dimensional mapping and coordinate system associated with the particular data center 104 to determine the route. In some embodiments, the data visualization application, the infrastructure controller, or any other suitable device may generate the three-dimensional mapping and coordinate system based on the one or more motion sensors 124 disposed in and around each data center 104, a set of building layout documents, or both.

With this information, the infrastructure controller 106 can identify a path to the particular infrastructure device 110 if the infrastructure controller 106 knows the location of the technician.

The infrastructure controller 106 can learn the location of the technician within the data center using any one of a number of techniques. For example, the infrastructure controller 106 can use data from a motion sensor 124, or a camera 128 within the data center. In some embodiments, the infrastructure controller 106 may request the data from the one or more motion sensors or cameras on a set interval, at any moment in time, over a period of time, or any combination thereof.

In other examples, the infrastructure controller 106 can learn the position of the technician from information received from the data center facility visualization application 118 operating on the client device 102 of the technician. For example, the data center facility visualization application 118 could locate the technician within the data center using BLE beacons or trilateration techniques based on signals emitted from transmitters such as wireless access points. In some embodiments, the infrastructure controller 106 may continuously request the location of the data center facility visualization application 118 while the route to the particular infrastructure device is active. The route can remain active for a predetermined period or until it is determined that the technician has reached the particular infrastructure device.

According to some examples, the method includes identifying infrastructure devices along the route to the particular infrastructure device at block 210. For example, the infrastructure controller 106 illustrated in FIG. 1 may identify the infrastructure device along the route to the particular infrastructure device.

While block 208 and block 210 discuss the infrastructure controller as determining the route and the infrastructure devices along the route, in some embodiments, these functions can be performed by the data center facility visualization application, which can have a map of the data center and provide the identification of the infrastructure devices along the route to the infrastructure controller 106.

As addressed above, the infrastructure controller 106 is capable of communicating directly with individual infrastructure devices.

According to some examples, the method includes sending a first control signal to the infrastructure devices along the route to the particular infrastructure device to control a visual appearance of the infrastructure devices that are along the route to the particular infrastructure device at block 212. For example, the infrastructure controller 106 illustrated in FIG. 1 may send a first control signal to the infrastructure device along the route to the particular infrastructure device to control their visual appearance. In some embodiments, the respective infrastructure devices can first poll the infrastructure controller 106 asking whether the infrastructure device should modify their visual appearance, and in response the infrastructure controller 106 can send the control signal.

In some embodiments, the control signal can be sent to all of the infrastructure devices that are along the route to the particular infrastructure device, such that the technician can easily follow a path made by the lighting on the infrastructure devices. In some embodiments, the control signal can be sent to a subset of the infrastructure devices that are proximate to the technician as they progress along the path to the particular infrastructure device. For example, as the technician nears a subset of the infrastructure devices, the infrastructure controller 106 can send a signal to the subset of infrastructure devices to present a lighting pattern indicative of the path to the particular infrastructure device. As the technician progresses further, the infrastructure controller 106 can send signals to additional infrastructure devices along the path to present a lighting pattern indicative of the path to the particular infrastructure device.

As addressed above, the infrastructure controller 106 can learn of the location of the technician from the client device 102 or from devices such as cameras and motion sensors in the data center. In some embodiments, the infrastructure controller 106 can also learn information about the direction the technician is heading and the speed at which the technician is traveling and use this information to selectively control the infrastructure devices along the path.

In some embodiments, the infrastructure controller 106 may predict the location of a technician in the data center based on the route to the particular infrastructure device and the expected speed of travel by the technician. The infrastructure controller 106 may determine the expected speed of travel by the technician based on the data provided by the one or more motion sensors, cameras, or the data center facility visualization application (as approximated from data from inertial measurement units on the client device).

According to some examples, the method includes receiving the first control signal at block 214. For example, the infrastructure devices 108 illustrated in FIG. 1 may receive the first control signal. The first infrastructure device or/and the particular infrastructure device includes a baseboard management controller that is configured to control lights on the first infrastructure device or/and the particular infrastructure device. In some embodiments, the baseboard management controllers disposed within each infrastructure device may receive the first control signal.

According to some examples, the method includes actuating a light source of the first infrastructure device as instructed by the first control signal at block 216. For example, the infrastructure devices 108 illustrated in FIG. 1 may actuate a light source of the first infrastructure device as instructed by the first control signal. In some embodiments, the baseboard management controller disposed within a respective infrastructure device may actuate the light source based on the first control signal.

In some embodiments, the first control signal can be sent to only one or a few of the first infrastructure devices. The first infrastructure device(s) receiving the first control signal can then take on the task of identifying the next first infrastructure device in the path to the particular infrastructure device, and then forwarding the instructions, daisy-chain style. This way, the infrastructure controller only sends the first instruction, and the next part of the path to the particular infrastructure device is calculated by the current first infrastructure device and then communicated directly via a control signal originating from the current first infrastructure device to the next first infrastructure device.

In some embodiments, rather than sending a control signal to infrastructure devices 108 along the route to the particular infrastructure device 110, the infrastructure controller 106 can send signals to infrastructure devices 108 that are not on the path to the infrastructure controller 106. In this way, the data center lighting can create a 'negative' path—that is a path can be generated from lights that are not controlled, or lights that are controlled to be off, while others remain on.

According to some examples, the method includes sending a second control signal to the particular infrastructure device to control the visual appearance of the particular infrastructure device at block 218. For example, the infrastructure controller 106 illustrated in FIG. 1 may send a second control signal to the particular infrastructure device to control the visual appearance of the particular infrastructure device. The second control signal is an instruction to display a different visual appearance than provided to the particular infrastructure devices along the route to the particular infrastructure device. It should be understood that the visual appearance of multiple particular infrastructure devices may be controlled, such that the multiple particular infrastructure devices can be controlled to be visually distinct from the infrastructure devices actuated based on the first control signal.

According to some examples, the method includes receiving the second control signal at block 220. For example, the particular infrastructure device 110 illustrated in FIG. 1 may receive the second control signal. In some embodiments, the baseboard management controllers disposed within the particular infrastructure device may receive the second control signal.

According to some examples, the method includes actuating a light source of the particular infrastructure device as instructed by the second control signal at block 222. For example, the particular infrastructure device 110 illustrated in FIG. 1 may actuate a light source of the particular infrastructure device as instructed by the second control signal. In some embodiments, the baseboard management controllers disposed within the particular infrastructure device may actuate the light source based on the second control signal.

In some embodiments, the lights on the infrastructure devices might be controlled to encode information in a sequence of flashes that identifies a server. In such embodiments, a technician can utilize their client device running the data center facility visualization application as an extended reality/augmented reality device whereby the client device can use its camera to capture video frames including sequences of flashing lights on the infrastructure devices and the data center facility visualization application can decode the identities of the servers in the frames. In this way, the data center facility visualization application can provide navigation instructions to the technician through audio or visual prompts given through the client device. The use of the client device in this way can also be used as a mechanism to learn the location of the technician and to report the location to the infrastructure controller. In some instances, the use of the client device in this way might obviate the need to know the location of the user when all of the infrastructure devices in the data center are caused to encode their identity in this way. The infrastructure controller would not need to know the technician's location if the data center facility visualization application were to be used to determine the navigation instructions.

In some embodiments, the infrastructure controller might need to account for there being more than one data center technician. In such instances, it would not be desirable if the infrastructure controller were to cause a change in the operation of devices in the vicinity of a second technician. Therefore, the infrastructure controller might take into account the location of additional technicians when determining a path to a particular infrastructure device. The infrastructure device (or data center facility visualization application) could create a path that would minimize causing changes in the lighting displays of infrastructure devices near additional technicians.

Collectively, the method illustrated in FIG. 2 causes infrastructure devices along a path to a particular infrastructure device to operate light elements on the infrastructure devices such that the light elements on the infrastructure devices along the path create a pattern that indicates a path to the particular infrastructure device. The particular infrastructure device can operate its light elements differently from the infrastructure devices along the path to distinguish itself.

The infrastructure devices can return to normal operation when the technician passes some infrastructure devices that are already displaying a lighting pattern indicative of the path to the particular infrastructure device, after a period has passed, or after receiving a further signal from the infrastructure controller 106 instructing a return to normal operation.

Figure 3:
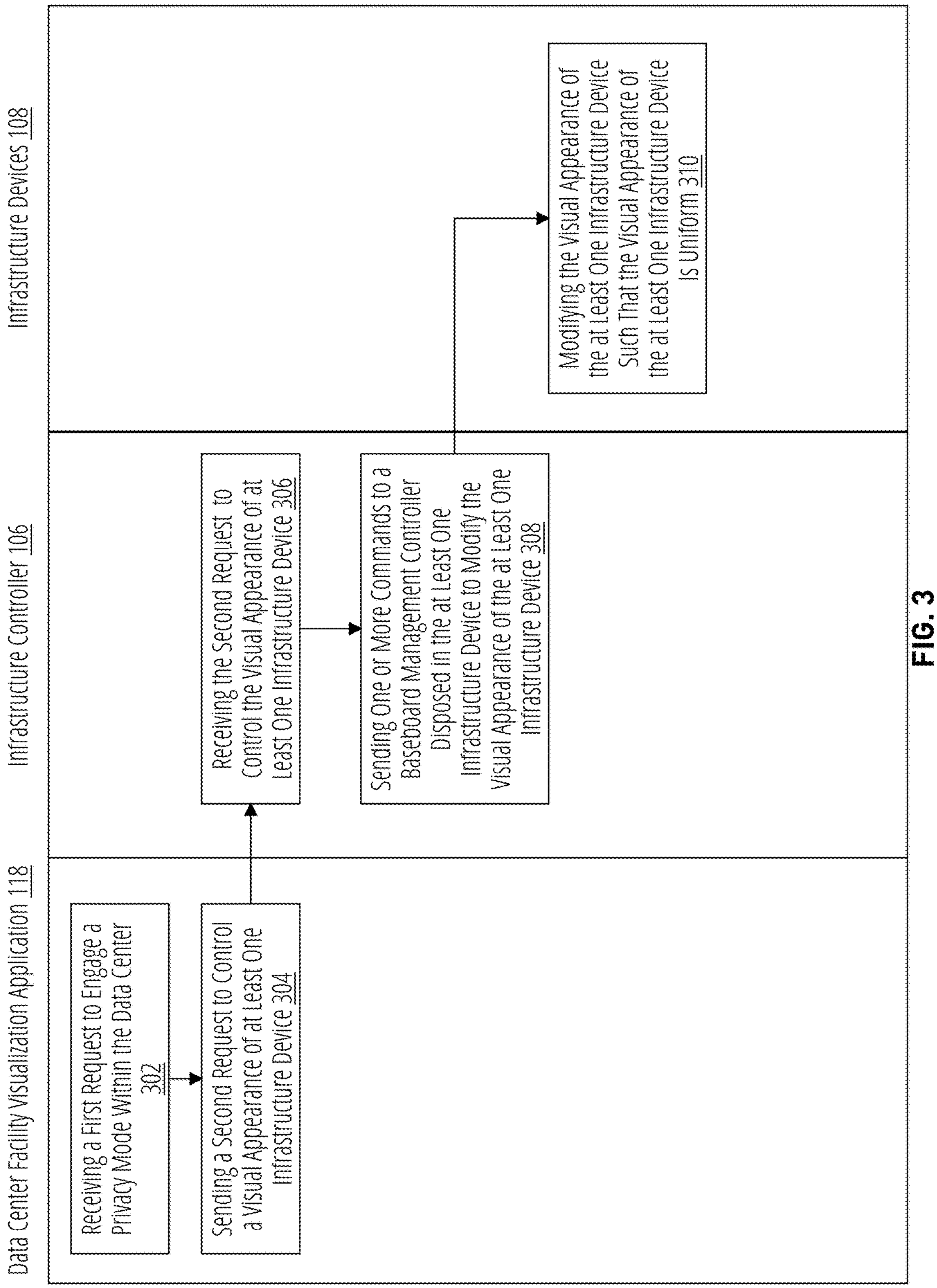
FIG. 3 illustrates an example routine for initiating a privacy mode within the data center in accordance with some embodiments of the present technology.

FIG. 3 illustrates an example routine for initiating a privacy mode within the data center in accordance with some embodiments of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence. For example, some functions performed by the data center facility visualization application 118 or the infrastructure controller 106 could be interchangeable (i.e., could occur on the other device).

As introduced above, the lights on some infrastructure devices are generally programmed to indicate status information. However, sometimes it is not desirable to display the status information. For example, it can sometimes occur that guests are allowed to tour a data center. In such an example, it would not be desirable to have infrastructure devices display status information, especially status information that might indicate that one or more infrastructure devices are not operating properly. In another example, devices that are doing a lot of computation might experience some dimming of their status lights. It is possible that a knowledgeable person could infer sensitive information from the dimming of the status lights.

Accordingly, the present technology can be used to operate the status lights on infrastructure devices to avoid revealing information, whether about positive status, negative status, load information, or any other information. In some embodiments, the infrastructure devices can be controlled to display a uniform pattern. In some embodiments, the infrastructure devices can be controlled to be off for a period. In some embodiments, the infrastructure devices can be controlled to display a demonstration pattern.

According to some examples, the method includes receiving a first request to engage a privacy mode within the data center at block 302. For example, the data center facility visualization application 118 illustrated in FIG. 1 may receive a first request to engage a privacy mode within the data center. A technician or operator of the data center can interact with data center facility visualization application 118 to request that at least one of the infrastructure devices 108 enter into a privacy mode.

According to some examples, the method includes sending a second request to control a visual appearance of at least one infrastructure device in a privacy mode at block 304. For example, the data center facility visualization application 118 illustrated in FIG. 1 may send a second request to control the visual appearance of at least one infrastructure device to operate lights on the infrastructure devices in a way that does not reveal status or computational load. In some embodiments, the aim is to make all lights appear uniform or even to turn them all off. At a minimum, the goal may be to avoid reading out a status that indicates one of the infrastructure devices is performing poorly, or well, or giving away any other information based on one or more key performance indicators.

According to some examples, the method includes receiving the second request at block 306. For example, the infrastructure controller 106 illustrated in FIG. 1 may receive the second request.

In some embodiments, the privacy mode can be initiated automatically by the infrastructure controller 106. In such embodiments, a camera in the data center may utilize facial recognition technology and be trained to recognize authorized personnel. When the camera system determines that it does not recognize someone in the data center, the camera could send the request to the infrastructure controller 106 to initiate the privacy mode.

According to some examples, the method includes sending one or more commands to a baseboard management controller disposed in the at least one infrastructure device to modify the visual appearance of the at least one infrastructure device at block 308. For example, the infrastructure controller 106 illustrated in FIG. 1 may send one or more commands to the baseboard management controller disposed in the at least one infrastructure device to modify the visual appearance of the at least one infrastructure device. In some embodiments, the infrastructure controller 106 may send the one or more commands at set intervals to engage privacy mode.

According to some examples, the method includes modifying the visual appearance of the at least one infrastructure device such that the visual appearance of the at least one infrastructure device is uniform at block 310. For example, the baseboard management controller 120 illustrated in FIG. 1 may modify the visual appearance of the at least one infrastructure device such that the visual appearance of the at least one infrastructure device is uniform. For example, the light source comprising the visual appearance of at least one infrastructure device has a consistent level of brightness that does not change due to the processing load behavior of at least one infrastructure device. In another example, the light source described above is off. At a minimum, the goal may be to avoid reading out a status that indicates one of the infrastructure devices is performing poorly based on one or more key performance indicators.

Figure 4:
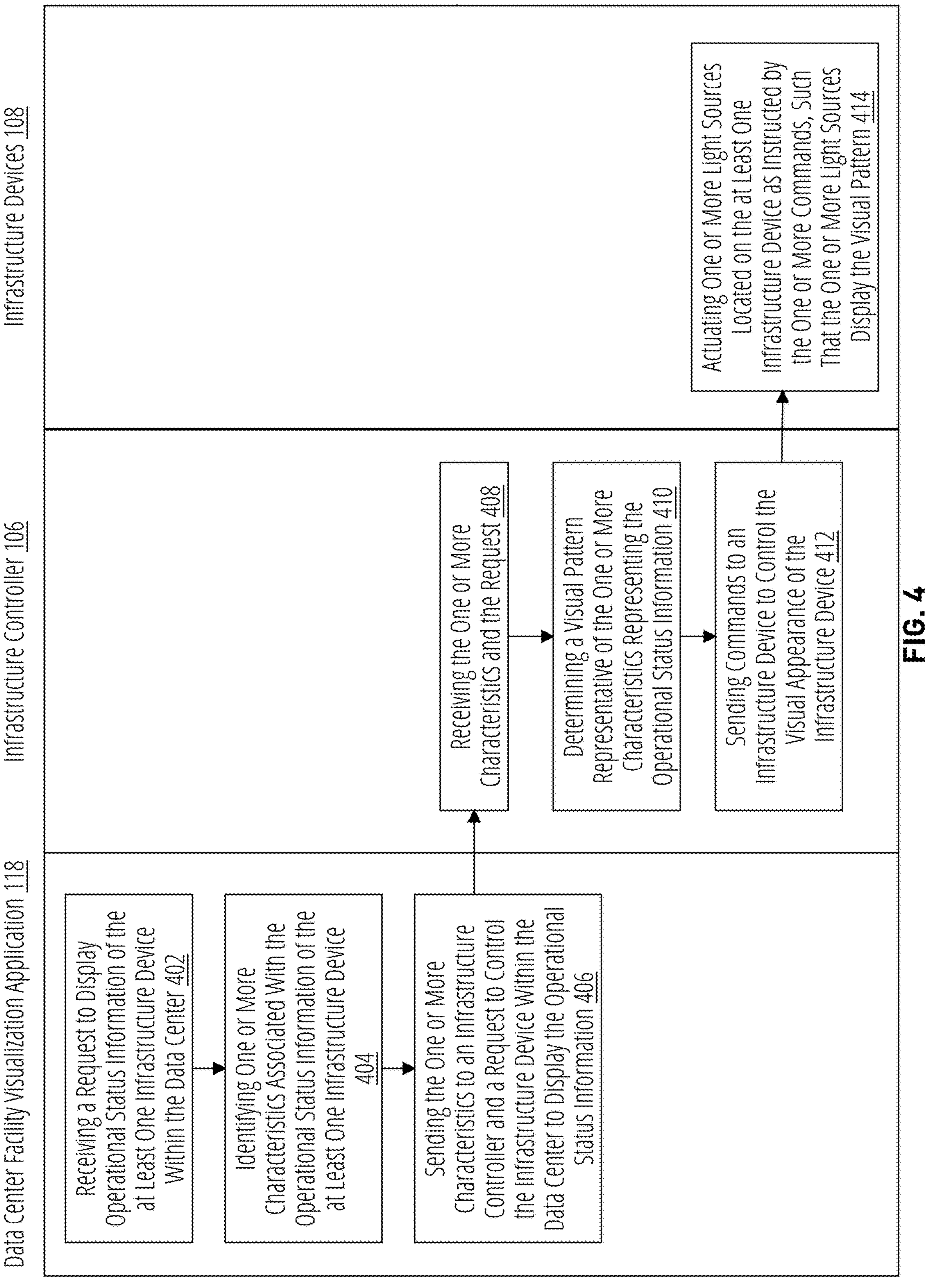
FIG. 4 illustrates an example routine for displaying the operational status of at least one infrastructure device by generating a visual pattern representative of the operational status in accordance with some embodiments of the present technology.

FIG. 4 illustrates an example routine for displaying the operational status of at least one infrastructure device by generating a visual pattern representative of the operational status in accordance with some embodiments of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence. For example, some functions performed by the data center facility visualization application 118 or the infrastructure controller 106 could be interchangeable (i.e., could occur on the other device).

In some embodiments, it might be useful to have an infrastructure device display more information than is typically able to be conveyed by the lighting elements on the infrastructure device. For example, some servers can include lights that indicate whether the server is powered on, whether there is hard disk activity occurring, whether there is network activity occurring, whether a fan is operational, or whether the server is above a threshold temperature, and/or a light that indicates a coarse metric of system health. However, in some instances, it might be useful to know more granular information about the operational status (current or past) of the server. In such instances, the present technology could be used to instruct the server to encode information in an optical pattern using one or more lights. In another example, the present technology could instruct the server to encode information about a task for the technician to execute (e.g., it can explicitly communicate the necessary task to the technician, e.g. "swap disk 1", "re-seat connector 13", "replace fan 13", etc.). A technician can use a camera on their client device to record and interpret the data encoded in the optical pattern. In this way, a particular infrastructure device can communicate more detailed information directly to a technician's client device.

According to some examples, the method includes receiving a request to display operational status information of at least one infrastructure device within the data center at block 402. For example, the data center facility visualization application 118 illustrated in FIG. 1 may receive a request to display operational status information of at least one infrastructure device within the data center.

According to some examples, the method includes identifying one or more characteristics associated with the operational status information of the at least one infrastructure device at block 404. For example, the data center facility visualization application 118 illustrated in FIG. 1 may identify one or more characteristics associated with the operational status information of the at least one infrastructure device. The one or more characteristics include, for example, health, stability, power usage, error logs, or other status information.

According to some examples, the method includes sending the one or more characteristics to an infrastructure controller and a request to control the infrastructure device within the data center to display the operational status information at block 406. For example, the data center facility visualization application 118 illustrated in FIG. 1 may send the one or more characteristics to an infrastructure controller and a request to control the infrastructure device within the data center to display the operational status information.

According to some examples, the method includes receiving the one or more characteristics and the request at block 408. For example, the infrastructure controller 106 illustrated in FIG. 1 may receive the one or more characteristics and the request.

According to some examples, the method includes determining a visual pattern representative of the one or more characteristics representing the operational status information at block 410. For example, the infrastructure controller 106 illustrated in FIG. 1 may determine a visual pattern representative of the one or more characteristics representing the operational status information. The infrastructure controller 106 can determine the visual pattern such that the visual pattern represents one or more strings of binary, hexadecimal, or both. The infrastructure controller 106 needs to inform the infrastructure device and the data center facility visualization application of any information needed to encode or decode the information so the data center facility visualization application on the client device is able to decode the information provided by the infrastructure device.

According to some examples, the method includes sending one or more commands to a baseboard management controller disposed in the at least one infrastructure device to control a visual appearance of the at least one infrastructure device such that the visual appearance of the at least one infrastructure device matches the visual pattern at block 412. For example, the infrastructure controller 106 illustrated in FIG. 1 may send one or more commands to a baseboard management controller disposed in the at least one infrastructure device to control a visual appearance of the at least one infrastructure device such that the visual appearance of the at least one infrastructure device matches the visual pattern.

According to some examples, the method includes actuating one or more light sources located on the at least one infrastructure device as instructed by the one or more commands, such that the one or more light sources display the visual pattern at block 414. For example, the baseboard management controller 120 illustrated in FIG. 1 may actuate one or more light sources located on the at least one infrastructure device as instructed by the one or more commands, such that the one or more light sources display the visual pattern.

Figure 5:
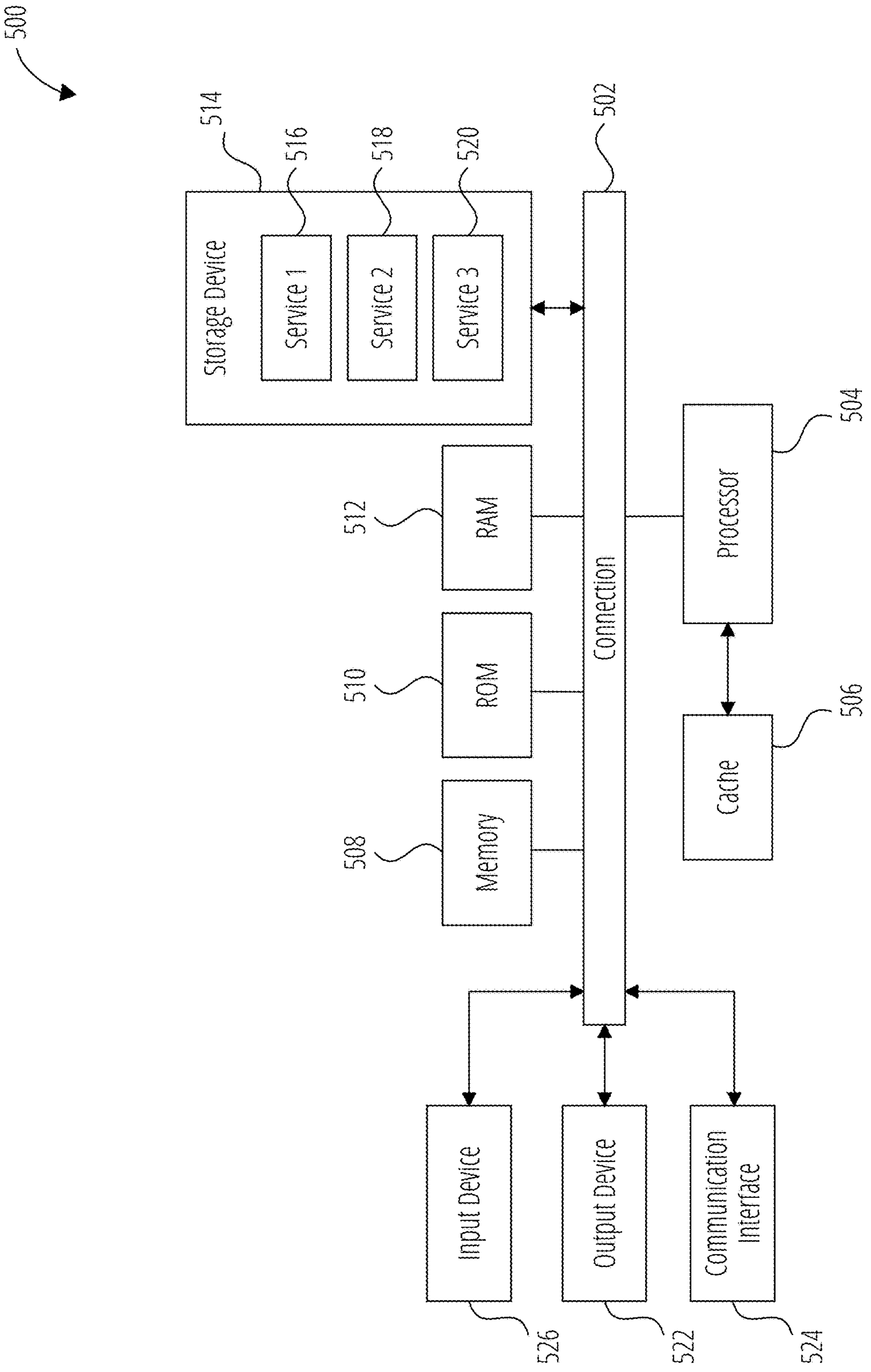
FIG. 5 shows an example of a system for implementing certain aspects of the present technology.

FIG. 5 shows an example of computing system 500, which can be for example any computing device making up client device 102, infrastructure controller 106, infrastructure devices 108, or any component thereof in which the components of the system are in communication with each other using connection 502. Although the example system depicts particular system components and an arrangement of such components, this depiction is to facilitate a discussion of the present technology and should not be considered limiting unless specified in the appended claims. For example, some components that are illustrated as separate can be combined with other components, some components can be divided into separate components, some components might not be present or needed, and additional components may be present.

Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (CPU or processor) 504 and connection 502 that couples various system components including system memory 508, such as read-only memory (ROM) 510 and random access memory (RAM) 512 to processor 504. Computing system 500 can include a cache of high-speed memory 506 connected directly with, in close proximity to, or integrated as part of processor 504.

Processor 504 can include any general purpose processor and a hardware service or software service, such as services 516, 518, and 520 stored in storage device 514, configured to control processor 504 as well as a special-purpose processor where software instructions are incorporated into the actual processor design. Processor 504 may essentially be a completely self-contained computing system, containing multiple cores or processors, a bus, memory controller, cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

Storage device 514 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 514 can include software services, servers, services, etc., that when the code that defines such software is executed by the processor 504, it causes the system to perform a function. In some embodiments, a hardware service that performs a particular function can include the software component stored in a computer-readable medium in connection with the necessary hardware components, such as processor 504, connection 502, output device 522, etc., to carry out the function.

For clarity of explanation, in some instances, the present technology may be presented as including individual functional blocks including functional blocks comprising devices, device components, steps or methods in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspects

The present technology includes computer-readable storage mediums for storing instructions, and systems for executing any one of the methods embodied in the instructions addressed in the aspects of the present technology presented below:

Aspect 1. A method of controlling infrastructure devices within a data center to display information to guide a technician to a particular infrastructure device within the data center, the method comprising: receiving, by an infrastructure controller, an identification of the particular infrastructure device within the data center; determining, by the infrastructure controller, a route to the particular infrastructure device; identifying, by the infrastructure controller, an identification of the infrastructure devices along the route to the particular infrastructure device; and sending, by the infrastructure controller, a first control signal to the infrastructure devices along the route to the particular infrastructure device to control a visual appearance of the infrastructure devices along the route to the particular infrastructure device.

Aspect 2. The method of Aspect 1, further comprising: sending, by the infrastructure controller, a second control signal to the particular infrastructure device to control a visual appearance of the particular infrastructure device, wherein the second control signal is an instruction to display a different visual appearance than the infrastructure devices along the route to the particular infrastructure device.

Aspect 3. The method of any one of Aspects 1-2, further comprising: capturing video frames, by a client device operating a data center facility visualization application, of the visual appearance of a first infrastructure device of the infrastructure devices; interpreting, by the data center facility visualization application, data encoding in the visual appearance of the first infrastructure device that is sufficient to identify the first infrastructure device; identifying, by the data center facility visualization application, the first infrastructure device on a map of the data center relative to the particular infrastructure device; and displaying, by the data center facility visualization application, directional queues pointing towards the particular infrastructure device.

Aspect 4. The method of any one of Aspects 1-3, further comprising: receiving, by a first infrastructure device of the infrastructure device along the route to the particular infrastructure device the first control signal; and after receiving the first control signal, actuating, by the first infrastructure device, a light source of the first infrastructure device as instructed by the first control signal.

Aspect 5. The method of any one of Aspects 1-4, further comprising: receiving, by a data center facility visualization application executing on a client device associated with a technician user account, an identification of the particular infrastructure device within the data center; sending, by the data center facility visualization application, the identification of the particular infrastructure device to the infrastructure controller, with a request to control the infrastructure device within the data center to display information to guide the technician to the particular infrastructure device.

Aspect 6. The method of any one of Aspects 1-5, further comprising: receiving, by the particular infrastructure device the second control signal; and after receiving the second control signal, actuating, by the particular infrastructure device, a light source of the particular infrastructure device as instructed by the second control signal.

Aspect 7. The method of any one of Aspects 1-5, further comprising: receiving, by the infrastructure controller, a location indicator from the client device associated with the technician user account, the location indicator being data corresponding to a location of the client device within the data center; sending the first control signal to a subset of the infrastructure device, wherein the subset of the infrastructure device are infrastructure device proximate to the technician and ahead of the technician in the route to the particular infrastructure device.

Aspect 8. The method of any one of Aspects 1-7, further comprising: predicting, by the infrastructure controller, a location of a technician in the data center, based on the route to the particular infrastructure device and expected speed of travel by the technician; sending the first control signal to a subset of the infrastructure device, wherein the subset of the infrastructure device are infrastructure device proximate to the technician and ahead of the technician in the route to the particular infrastructure device.

Aspect 9. The method of any one of any one of Aspects 1-8, wherein the sending the first control signal to the infrastructure device along the route to the particular infrastructure device to control the visual appearance of the infrastructure device along the route to the particular infrastructure device further comprises: sending the first control signal to a subset of the infrastructure device, wherein the subset of the infrastructure device are infrastructure device proximate to the technician and ahead of the technician in the route to the particular infrastructure device.

Aspect 10. The method of any one of Aspects 1-9, wherein the first infrastructure device includes a baseboard management controller that is configured to control lights on the first infrastructure device in response to the first control signal.

Aspect 11. The method of any one of Aspects 1-10, wherein an infrastructure device is a server, router, or overhead lighting device in the data center.

Aspect 12. A method of any one of Aspects 1-11, further comprising: controlling infrastructure device within a data center to obscure information associated with server behavior on the infrastructure device from changing of a visual appearance of the infrastructure device, the method comprising: receiving, by a data center facility visualization application executing on a client device, a first request to engage a privacy mode within the data center; sending, by the data center facility visualization application, a second request to control a visual appearance of at least one infrastructure device; receiving, by an infrastructure controller, the second request; sending, by the infrastructure controller, one or more commands to a baseboard management controller disposed in the at least one infrastructure device to modify the visual appearance of the at least one infrastructure device; and modifying, by the baseband controller, the visual appearance of the at least one infrastructure device such that the visual appearance of the at least one infrastructure device is uniform.

Aspect 13. The method any one of Aspects 1-12, comprising: determining, by one or more motion sensors communicatively coupled to the infrastructure controller, a presence of one or more persons within the data center; and upon determining the presence of the one or more persons within the data center, automatically initiating privacy mode.

Aspect 14. The method of any one of Aspects 1-13, wherein the one or more motion sensors are disposed within the data center, at one or more entrances to the data center, or both.

Aspect 15. The method any one of Aspects 1-14, comprising: sending, by the infrastructure controller, historical motion data captured by the one or more motion sensors to the data center facility visualization application; determining, by the data center facility visualization application, one or more intervals to automatically enable privacy mode based at least upon the historical motion data indicating intervals of time when the presence of the one or more persons is routinely detected.

Aspect 16. The method of any one of Aspects 1-15, comprising executing the data center facility visualization application in a web browser.

Aspect 17. The method of any one of Aspects 1-16, comprising: sending, by the infrastructure controller, a third request to the baseboard management controller of the at least one infrastructure device; modifying, by the baseboard management controller, processing behavior of the at least one infrastructure device reflected in the visual appearance of the at least one infrastructure device such that the visual appearance of the infrastructure device represents a selected phrase, emoticon, or any suitable image.

Aspect 18. A method of any one of Aspects 1-17, further comprising: controlling infrastructure device within a data center to display status information to a client device, wherein the status information comprises one or more characteristics of at least one infrastructure device and the data center, the method comprising: receiving, by a data center facility visualization application executing on the client device, a request to display operational status information of the at least one infrastructure device within the data center; identifying, by the data center facility visualization application, one or more characteristics associated with the operational status information of the at least one infrastructure device; sending, by the data center facility visualization application, the one or more characteristics to an infrastructure controller and a request to control the infrastructure device within the data center to display the operational status information; receiving, by the infrastructure controller, the one or more characteristics and the request; determining, by the infrastructure controller, a visual pattern representative of the one or more characteristics representing the operational status information; sending, by the infrastructure controller, one or more commands to a baseboard management controller disposed in the at least one infrastructure device to control a visual appearance of the at least one infrastructure device such that the visual appearance of the at least one infrastructure device matches the visual pattern; after receiving the one or more commands, actuating, by the baseboard management controller, one or more light sources located on the at least one infrastructure device as instructed by the one or more commands, such that the one or more light sources display the visual pattern.

Aspect 19. The method of any one of Aspects 1-18, wherein the one or more characteristics include health, stability, power usage.

Aspect 20. The method of any one of Aspects 1-19, comprising generating, by the infrastructure controller, the visual pattern such that the visual pattern represents one or more strings of binary, hexadecimal, or both.

Aspect 21. The method of any one of Aspects 1-20, comprising: detecting, by the baseboard management controller, changes in the one or more characteristics of the data center; sending, by the baseboard management controller, the changes to the infrastructure controller; and after receiving the changes in the one or more characteristics of the data center, by the infrastructure controller, automatically updating the visual pattern such that the visual pattern reflects the changes in the one or more characteristics of the data center.

What is claimed is:

1. A method comprising:

receiving, by an infrastructure controller, an identification of a particular infrastructure device within a data center;

determining, by the infrastructure controller, a route to the particular infrastructure device;

generating, by the infrastructure controller, a plurality of signals that indicate progress along the route to the particular infrastructure device using respective subsets of infrastructure devices along the route;

identifying, by the infrastructure controller, a first subset of one or more infrastructure devices along the route;

sending, by the infrastructure controller, a first control signal to the first subset of one or more infrastructure devices to modify a visual appearance of the first subset of one or more infrastructure devices; and sending a second control signal to a second subset of one or more infrastructure devices progressing from the first subset of one or more infrastructure devices along the route, the second control signal modifying a visual appearance of the second subset of one or more infrastructure devices.

2. The method of claim 1, further comprising:

sending, by the infrastructure controller, a final control signal to the particular infrastructure device to modify a visual appearance of the particular infrastructure device, wherein the final control signal is an instruction to display a different visual appearance than other infrastructure devices along the route to the particular infrastructure device.

3. The method of claim 1, further comprising:

capturing video frames, by a client device operating a data center facility visualization application, of the visual appearance of the first subset of one or more infrastructure devices;

interpreting, by the data center facility visualization application, data encoding in the visual appearance of the first subset of one or more infrastructure devices that is sufficient to identify the first subset of one or more infrastructure devices;

identifying, by the data center facility visualization application, the first subset of one or more infrastructure devices on a map of the data center relative to the particular infrastructure device; and displaying, by the data center facility visualization application, directional queues pointing towards the particular infrastructure device.

4. The method of claim 1, further comprising:

receiving, by a data center facility visualization application executing on a client device associated with a technician user account, an identification of the particular infrastructure device within the data center; and sending, by the data center facility visualization application, the identification of the particular infrastructure device to the infrastructure controller, with a request to control the first subset of one or more infrastructure devices within the data center to display information to guide a technician associated with the technician user account to the particular infrastructure device.

5. The method of claim 4, further comprising:

receiving, by the infrastructure controller, a location indicator from the client device associated with the technician user account, the location indicator including data corresponding to a location of the client device within the data center; and sending the first control signal to the first subset of one or more infrastructure devices, wherein the first subset of one or more infrastructure devices are infrastructure devices proximate to the technician and ahead of the technician in the route to the particular infrastructure device.

6. The method of claim 1, further comprising:

predicting, by the infrastructure controller, a location of a technician in the data center; and sending the first control signal to the first subset of one or more infrastructure devices, wherein the first subset of one or more infrastructure devices are infrastructure devices proximate to the technician and ahead of the technician in the route to the particular infrastructure device.

7. The method of claim 1, wherein the first subset of one or more infrastructure devices includes respective baseboard management controllers that are configured to control lights on the first subset of one or more infrastructure devices in response to the first control signal.

8. The method of claim 1, wherein the first subset of one or more infrastructure devices and the second subset of one or more infrastructure devices comprise servers, switches, routers, or overhead lighting devices in the data center.

9. A computing system comprising:

at least one processor; and a memory storing instructions that, when executed by the at least one processor, configure the computing system to:

receive, by an infrastructure controller, an identification of a particular infrastructure device within a data center;

determine, by the infrastructure controller, a route to the particular infrastructure device;

generate, by the infrastructure controller, a plurality of signals that indicate progress along the route to the particular infrastructure device using respective subsets of one or more infrastructure devices along the route;

identify, by the infrastructure controller, a first subset of one or more infrastructure devices along the route;

send, by the infrastructure controller, a first control signal to the first subset of one or more infrastructure devices to modify a visual appearance of the first subset of one or more infrastructure devices; and send a second control signal to a second subset of one or more infrastructure devices progressing from the first subset of one or more infrastructure devices along the route, the second control signal modifying a visual appearance of the second subset of one or more infrastructure devices.

10. The computing system of claim 9, wherein the instructions further configure the computing system to:

send, by the infrastructure controller, a final control signal to the particular infrastructure device to modify a visual appearance of the particular infrastructure device, wherein the final control signal is an instruction to display a different visual appearance than other infrastructure devices along the route to the particular infrastructure device.

11. The computing system of claim 9, wherein the instructions further configure the computing system to:

capture video frames, by a client device operating a data center facility visualization application, of the visual appearance of the first subset of one or more infrastructure devices;

interpret, by the data center facility visualization application, data encoding in the visual appearance of the first subset of one or more infrastructure devices that is sufficient to identify the first subset of one or more infrastructure devices;

identify, by the data center facility visualization application, the first subset of one or more infrastructure devices on a map of the data center relative to the particular infrastructure device; and display, by the data center facility visualization application, directional queues pointing towards the particular infrastructure device.

12. The computing system of claim 9, wherein the instructions further configure the computing system to:

receive, by a data center facility visualization application executing on a client device associated with a technician user account, an identification of the particular infrastructure device within the data center; and send, by the data center facility visualization application, the identification of the particular infrastructure device to the infrastructure controller, with a request to control the first subset of one or more infrastructure devices within the data center to display information to guide a technician associated with the technician user account to the particular infrastructure device.

13. The computing system of claim 12, wherein the instructions further configure the computing system to:

receive, by the infrastructure controller, a location indicator from the client device associated with the technician user account, the location indicator including data corresponding to a location of the client device within the data center; and send the first control signal to the first subset of one or more infrastructure devices, wherein the first subset of one or more infrastructure devices are infrastructure devices proximate to the technician and ahead of the technician in the route to the particular infrastructure device.

14. The computing system of claim 9, wherein the instructions further configure the computing system to:

predict, by the infrastructure controller, a location of a technician in the data center; and send the first control signal to the first subset of one or more infrastructure devices wherein the first subset of one or more infrastructure devices are infrastructure devices proximate to the technician and ahead of the technician in the route to the particular infrastructure device.

15. The computing system of claim 9, wherein the first subset of one or more infrastructure devices includes respective baseboard management controllers that are configured to control lights on the first subset of one or more infrastructure devices in response to the first control signal.

16. A non-transitory computer-readable storage medium comprising instructions stored thereon that when executed by at least one processor, cause the at least one processor to:

receive, by an infrastructure controller, an identification of a particular infrastructure device within a data center;

determine, by the infrastructure controller, a route to the particular infrastructure device;

generate, by the infrastructure controller, a plurality of signals that indicate progress along the route to the particular infrastructure device using respective subsets of infrastructure devices along the route;

identify, by the infrastructure controller, a first subset of one or more infrastructure devices along the route;

send, by the infrastructure controller, a first control signal to the first subset of one or more infrastructure devices to modify a visual appearance of the first subset of one or more infrastructure devices;

send a second control signal to a second subset of one or more infrastructure devices progressing from the first subset of one or more infrastructure devices along the route, the second control signal modifying a visual appearance of the second subset of one or more infrastructure devices;

identify, by a data center facility visualization application, the first subset of one or more infrastructure devices on a map of the data center relative to the particular infrastructure device; and display, by the data center facility visualization application, directional queues pointing towards the particular infrastructure device.

17. The non-transitory computer-readable storage medium of claim 16, wherein the instructions further configure the at least one processor to:

receive, by a data center facility visualization application executing on a client device associated with a technician user account, an identification of the particular infrastructure device within the data center; and send, by the data center facility visualization application, the identification of the particular infrastructure device to the infrastructure controller, with a request to control the first subset of one or more infrastructure devices within the data center to display information to guide a technician associated with the technician user account to the particular infrastructure device.

18. The non-transitory computer-readable storage medium of claim 17, wherein the instructions further configure the at least one processor to:

receive, by the infrastructure controller, a location indicator from the client device associated with the technician user account, the location indicator including data corresponding to a location of the client device within the data center; and send the first control signal to the first subset of one or more infrastructure devices, wherein the first subset of one or more infrastructure devices are infrastructure devices proximate to the technician and ahead of the technician in the route to the particular infrastructure device.

19. The non-transitory computer-readable storage medium of claim 16, wherein the instructions further configure the at least one processor to:

predict, by the infrastructure controller, a location of a technician in the data center; and send the first control signal to the first subset of one or more infrastructure devices wherein the first subset of one or more infrastructure devices are infrastructure devices proximate to the technician and ahead of the technician in the route to the particular infrastructure device.

20. The non-transitory computer-readable storage medium of claim 16, wherein the first subset of one or more infrastructure devices include respective baseboard management controllers that are configured to control lights on the first subset of one or more infrastructure devices in response to the first control signal.

* * * * *